(12) United States Patent
Arsin (10) Patent No.: US 8,082,951 B2
(45) Date of Patent: Dec. 27, 2011

(54) DIVERTER VALVE APPARATUS AND METHOD

(75) Inventor: Carl Arsin, Irvine, CA (US)

(73) Assignee: Pentair Water Pool and Spa, Inc., Sanford, NC (US)

( * ) Notice: Subject to any disclaimer, the term of this patent is extended or adjusted under 35 U.S.C. 154(b) by 1023 days.

(21) Appl. No.: 11/973,880

(22) Filed: Oct. 10, 2007
(Under 37 CFR 1.47)

(65) Prior Publication Data
US 2009/0095353 A1    Apr. 16, 2009

(51) Int. Cl.
*F16K 11/085* (2006.01)

(52) U.S. Cl. .................. 137/625.47; 251/118

(58) Field of Classification Search ............ 137/625.47; 251/118, 287
See application file for complete search history.

(56) References Cited

U.S. PATENT DOCUMENTS

| | | | |
|---|---|---|---|
| 1,562,981 A | 11/1925 | Muend | |
| 2,906,293 A | 9/1959 | Fraser et al. | |
| 3,349,799 A * | 10/1967 | Mueller et al. | 137/625.22 |
| 3,536,101 A * | 10/1970 | Bosworth | 137/315.17 |
| 3,938,553 A | 2/1976 | Ortega | |
| 4,044,789 A | 8/1977 | Elmore | |
| 4,169,491 A | 10/1979 | Bajka | |
| RE30,224 E | 3/1980 | Ortega | |
| 4,217,933 A * | 8/1980 | Perry et al. | 137/625.47 |
| 4,318,424 A | 3/1982 | Bajka | |
| 4,398,562 A * | 8/1983 | Saarem et al. | 137/625.47 |
| 4,470,429 A | 9/1984 | Johnson | |
| 4,543,996 A * | 10/1985 | Baron | 137/625.43 |
| 4,635,674 A | 1/1987 | Bajka | |
| 4,653,537 A * | 3/1987 | Voith | 137/625.43 |
| 4,655,252 A * | 4/1987 | Krumhansl | 137/595 |
| 4,989,640 A | 2/1991 | Steffes et al. | |
| 4,997,007 A | 3/1991 | Niemann et al. | |
| 5,076,319 A | 12/1991 | Salley et al. | |
| 5,137,048 A | 8/1992 | Brattoli | |
| 5,188,149 A | 2/1993 | Williams | |
| 5,193,582 A | 3/1993 | Antoniello et al. | |
| 5,287,889 A | 2/1994 | Leinen | |
| 5,299,777 A * | 4/1994 | Milstead | 251/144 |
| 5,482,251 A | 1/1996 | Roberts | |
| 5,511,584 A | 4/1996 | Leinen | |
| 5,845,670 A | 12/1998 | Life | |
| 6,076,554 A * | 6/2000 | Jensen et al. | 137/625.47 |
| 6,257,551 B1 | 7/2001 | Veiga | |
| 6,263,903 B1 | 7/2001 | Sjoberg | |
| 6,497,250 B1 | 12/2002 | Johann | |
| 6,899,117 B2 | 5/2005 | Marks | |
| 7,509,976 B2 * | 3/2009 | McNerney et al. | 137/625.11 |

(Continued)

*Primary Examiner* — John Fox
(74) *Attorney, Agent, or Firm* — Quarles & Brady LLP (57) ABSTRACT

Embodiments of the invention provide a diverter valve and a method of providing debris resistance in a diverter valve. The diverter valve can include a valve housing defining a valve chamber and at least an inlet port and an outlet port. The diverter valve can include a flow diverter extending into the valve chamber and pivotally coupled relative to the valve housing about a pivot axis defined through the valve chamber. The flow diverter can include a main portion extending into the valve chamber and a plunger portion disposed outside of the valve chamber. The main portion can have a diverting wall radially spaced apart from the pivot axis. The flow diverter can include a rib extending radially inwardly from the diverting wall toward the pivot axis. The diverter valve can also include at least one wing member positioned within the inlet port and secured relative to the valve housing.

3 Claims, 7 Drawing Sheets

U.S. PATENT DOCUMENTS

| | | |
|---|---|---|
| 7,849,877 B2 * | 12/2010 | Tan et al. ................. 137/625.46 |
| 2004/0045613 A1 | 3/2004 | Hinojosa, Jr. et al. |
| 2006/0169337 A1 | 8/2006 | Lopez |
| 2011/0089357 A1 | 4/2011 | Tan et al. |

* cited by examiner

DIVERTER VALVE APPARATUS AND METHOD

BACKGROUND

Diverter valves are typically multi-port valves which close off or limit fluid flow from an inlet port to one or more outlet ports while allowing fluid flow to one or more other outlet ports. For example, a diverter valve can be used in a pool and spa system, where the diverter valve allows fluid flow into the spa and then can be switched to allow fluid flow into the pool.

A diverter valve operates to direct fluid flow between ports. However, typical operation of a diverter valve can result in turbulence and/or noise in the fluid flow, which can contribute to inefficient and/or undesirable performance of the diverter valve in the pool and spa system. Debris, such as sand, can accumulate in a diverter valve during normal operation. The accumulation of debris can inhibit the ability of the valve to rotate and, thus, can also contribute to inefficient and/or undesirable performance of the diverter valve in the pool and spa system.

SUMMARY

In some embodiments, the invention provides a diverter valve including a valve housing defining a valve chamber and a plurality of ports in fluid communication with the valve chamber. The plurality of ports can include at least an inlet port and an outlet port. The diverter valve can further include a flow diverter extending into the valve chamber. The flow diverter can be pivotally coupled relative to the valve housing about a pivot axis defined through the valve chamber. The flow diverter can include a main portion extending into the valve chamber and a plunger portion disposed outside of the valve chamber. The main portion can have a diverting wall radially spaced apart from the pivot axis. The diverter valve can also include a cap component disposed outside of the valve housing and coupled to the plunger portion of the flow diverter.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
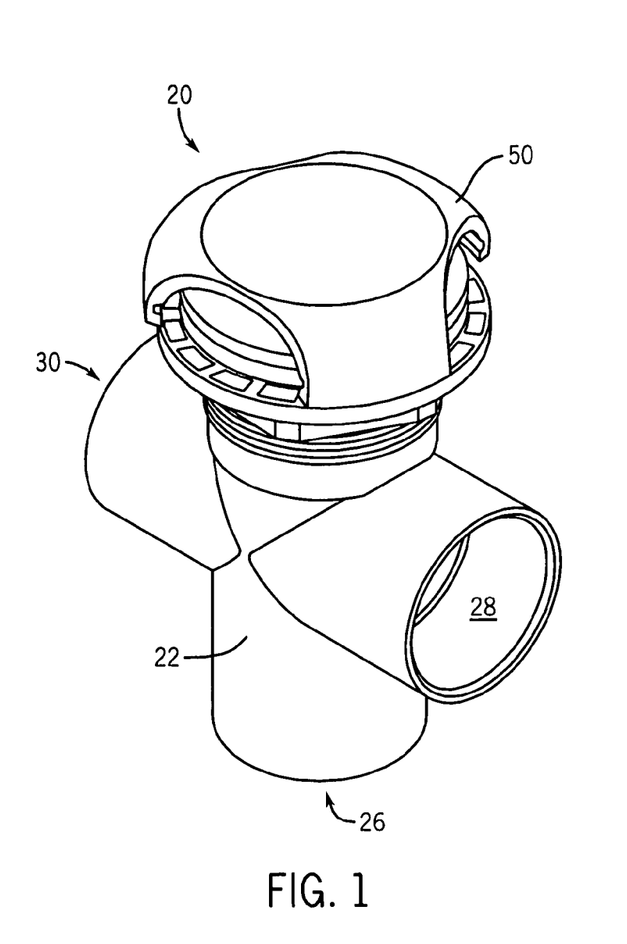
FIG. 1 is a perspective view of a diverter valve according to one embodiment of the invention.
Figure 2:
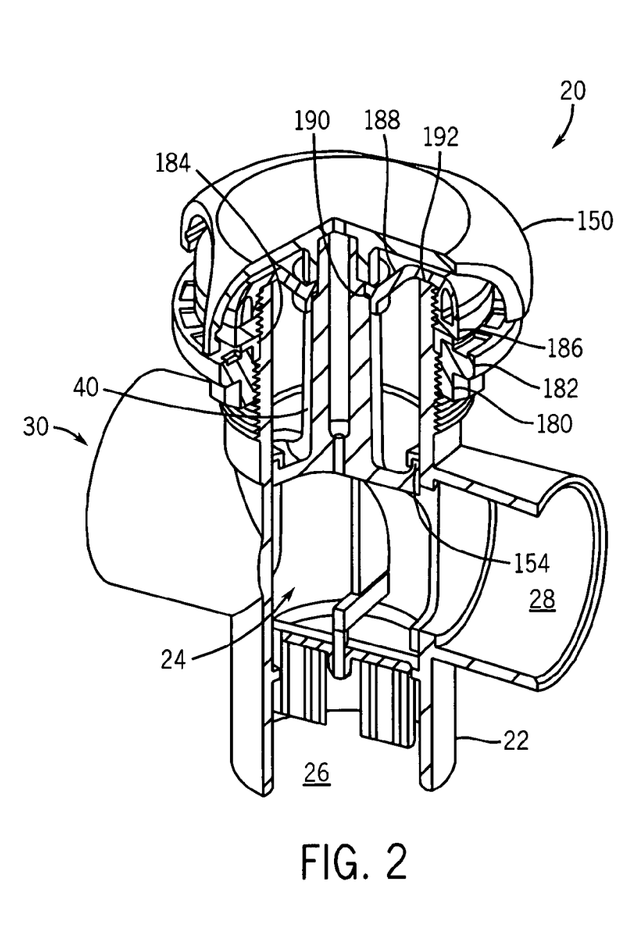
FIG. 2 is a partially-sectioned perspective view of the diverter valve of FIG. 1.
Figure 3:
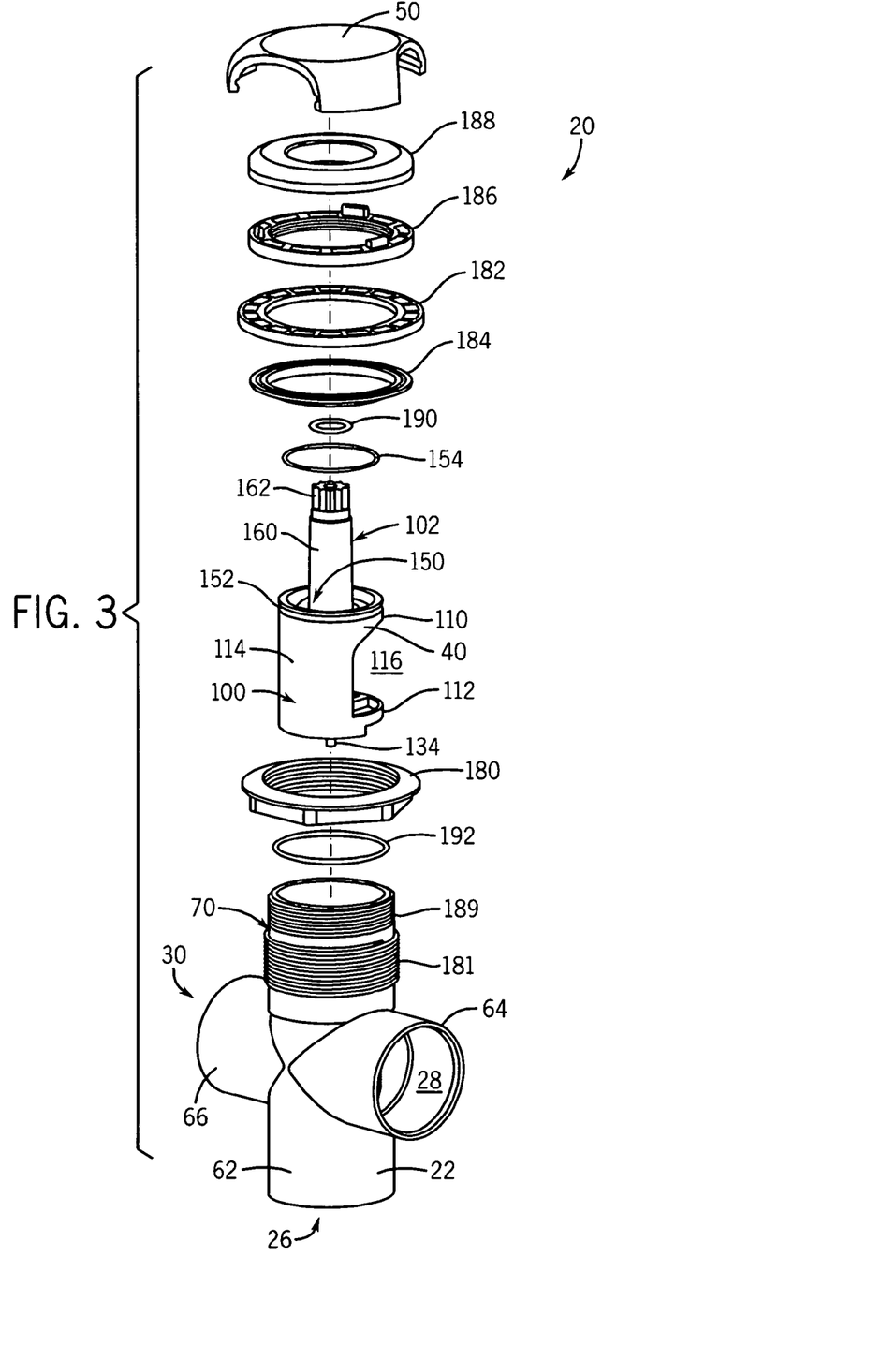
FIG. 3 is an exploded perspective view of the diverter valve of FIG. 1.

FIGS. 1-3 illustrate a diverter valve 20 according to one embodiment of the invention. The diverter valve 20 includes a valve housing 22. The valve housing 22 defines a valve chamber 24, an inlet port 26, a first outlet port 28, and a second outlet port 30. The diverter valve 20 includes a flow diverter 40 and a cap 50. The flow diverter 40 facilitates fluid communication between the inlet port 26 and one or more of a first outlet port 28 and a second outlet port 30. A cap 50 is operable to manipulate fluid flow through the flow diverter 40.

In some embodiments, the diverter valve 20 is configured for use with a pool and spa system. A user can manipulate the cap 50 in order to position the flow diverter 40 and, thus, control the flow of water from the inlet port 26 to the pool and another component (such as a spa or a heater) with the pool and the other component being in communication with the first outlet port 28 and the second outlet port 30, respectively.

Figures 4, 5:
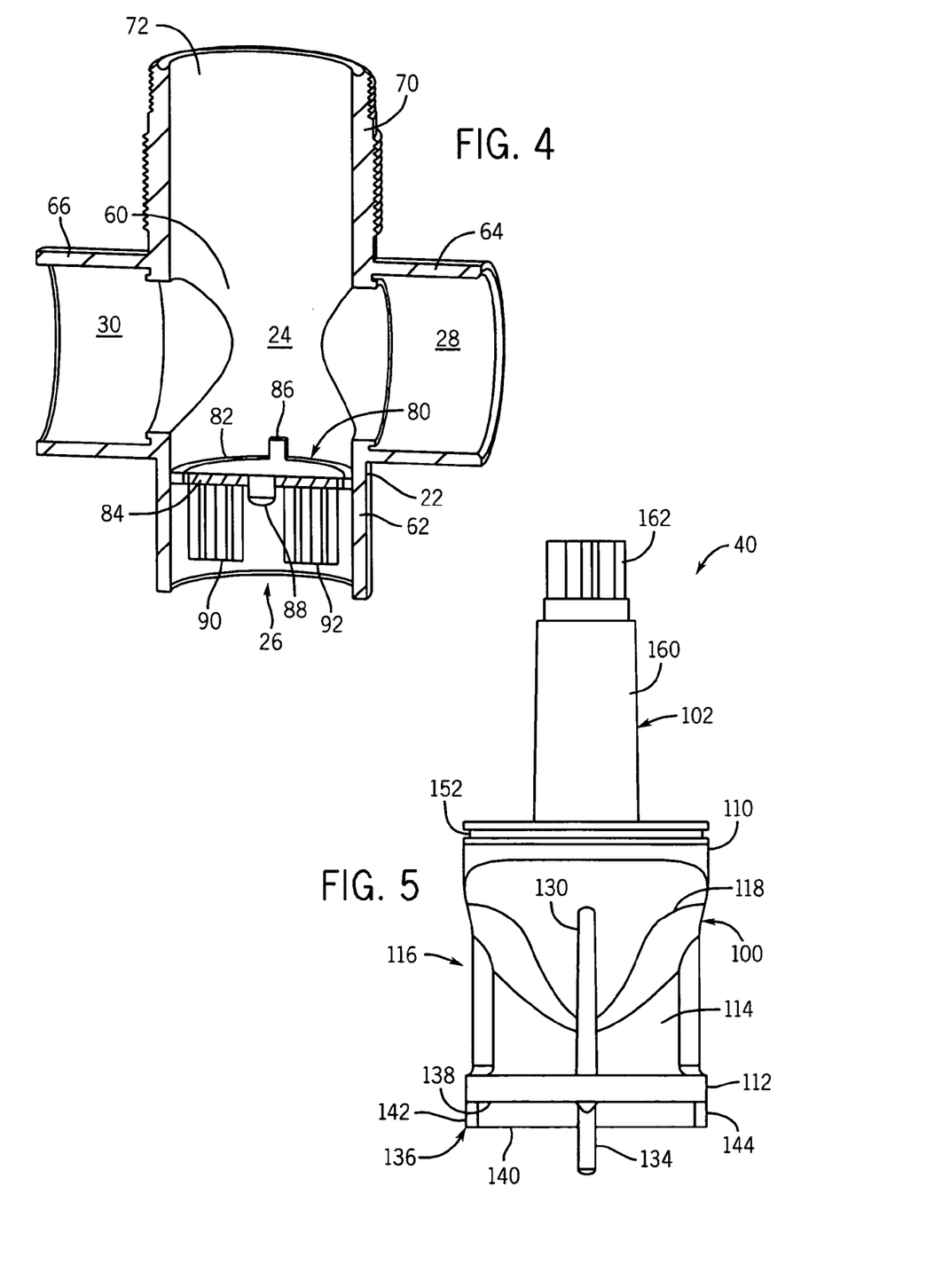
FIG. 4 is a sectioned perspective view of a valve housing according to one embodiment of the invention.
FIG. 5 is a front view of a flow diverter according to one embodiment of the invention.

FIG. 4 illustrates that the valve housing 22 includes a main section 60 defining a valve chamber 24. An inlet section 62 extends from the main section 60 and defines the inlet port 26. A first outlet section 64 extends from the main section 60 and defines the first outlet port 28, and a second outlet section 66 extends from the main section 60 and defines the second outlet port 30. A support section 70 also extends from the main section 60. An inside surface 72 extends throughout the valve housing 22 into each of the main section 60, the inlet section 62, the first outlet section 64, the second outlet section 66, and the support section 70.

In some embodiments, the inlet section 62, the first outlet section 64, the second outlet sections 66, and the support section 70 of the valve housing 22 each have a generally cylindrical shape. The term "axial" as used herein refers to a direction along the length of the generally cylindrical shape, and the term "radial" as used herein refers to a direction along a radius of the generally cylindrical shape.

The valve housing 22 is configured so that the inlet section 62 and the support section 70 oppose each other about the main section 60. The inlet section 62 and the support section 70 are aligned and centered along a common axial direction. The first outlet section 64 and the second outlet section 66 are also configured to oppose each other about the main section 60 and are also aligned and centered along a common axial direction so as to be oriented substantially perpendicular to the inlet section 62 and the support section 70.

As shown in FIG. 4, the valve housing 22 includes a diverter mounting feature 80. The diverter mounting feature 80 is disposed within the inlet port 26 proximate the main section 60, including a perimeter member 82 extending radially inwardly from the inside surface 72 around the inlet section 62. A transverse member 84 extends between opposing portions of the perimeter member 82 along a radial direction of the inlet section 62. A stop member 86 protrudes in an axial direction from the perimeter member 82 along the inside surface 72, and an aperture 88 is disposed in a generally central portion of the transverse member 84. The diverter mounting feature 80 engages and supports the flow diverter 40 when the diverter valve 20 is assembled.

As shown in FIG. 4, the valve housing 22 also includes a first wing member 90 and a second wing member 92. The first wing member 90 and the second wing member 92 are secured relative to the valve housing 22 at the transverse member 84 of the diverter mounting feature 80. The first wing member 90 and the second wing member 92 are generally elongate, rectangular, and thin in shape and are oriented to extend in an axial direction along the inlet section 62 away from the main section 60. The first wing member 90 and the second wing member 92 are configured to have opposing positions along a radial direction of the inlet section 62. The first wing member 90 and the second wing member 92 each define a length along the axial direction of the inlet section 62, a width along the radial direction of the inlet section 62, and a thickness in a direction perpendicular to both the axial and radial directions of the inlet section 62. The lengths, widths, and thicknesses of the first wing member 90 and the second wing member 92 can be substantially similar or the same. During operation of the diverter valve 20, the first wing member 90 and the second wing member 92 inhibit turbulence and noise from fluid flow through the inlet port 26 by encouraging a relatively laminar flow.

Figure 6:
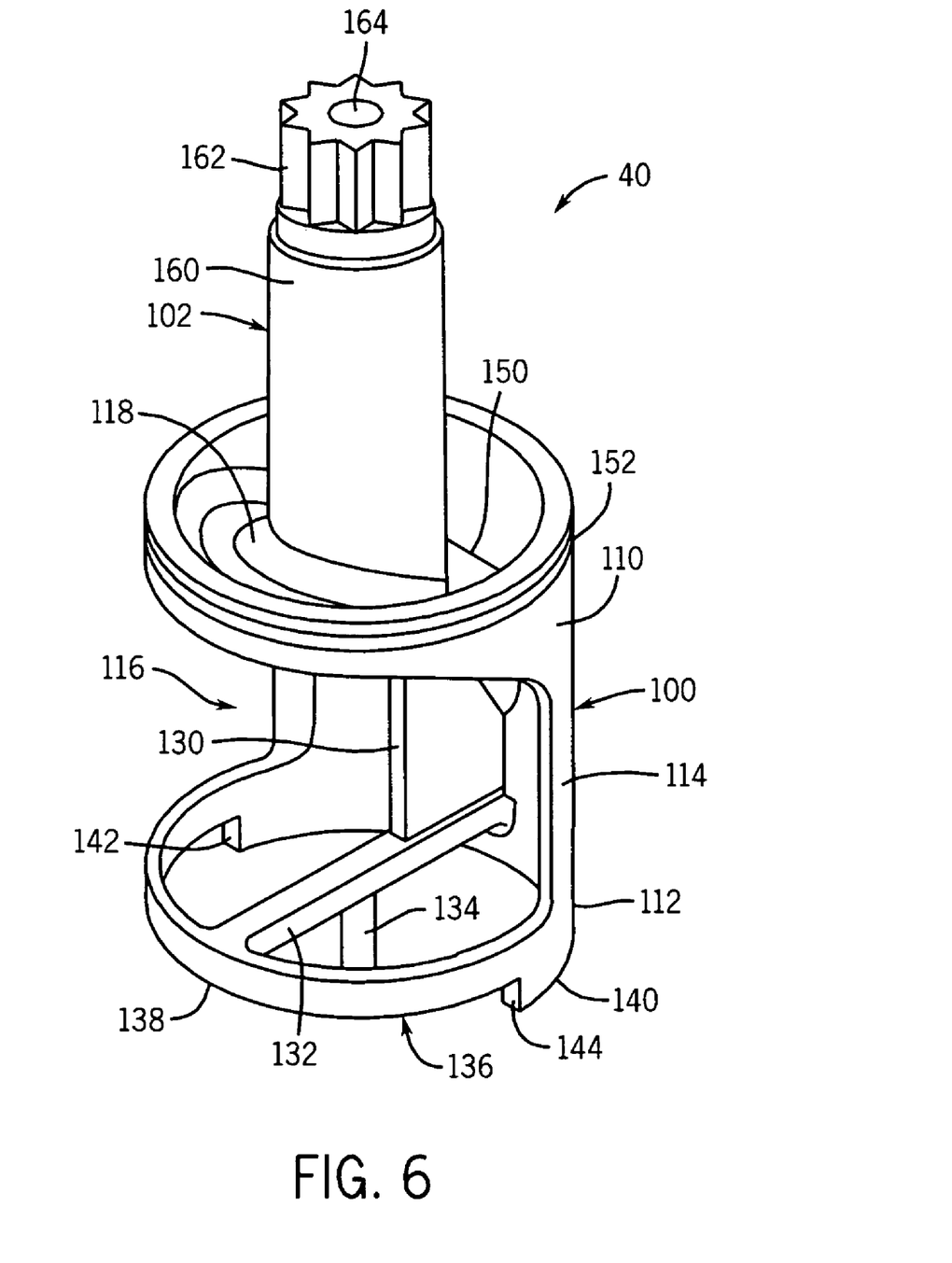
FIG. 6 is a perspective view of the flow diverter of FIG. 5.

As shown in FIGS. 5 and 6, the flow diverter 40 includes a main portion 100 and a plunger portion 102, each being generally cylindrically shaped portions. The main portion 100 includes an annular first end 110 proximate the plunger portion 102 and an annular second end 112 opposite the first end 110. A sidewall 114 and an aperture 116 extend between the first end 110 and the second ends 112. The main portion 100 includes an inclined wall 118 extending between the sidewall 114 and the first end 110.

As shown in FIG. 2, when the diverter valve 20 is assembled, the main portion 100 is disposed within the valve chamber 24 and the plunger portion 102 is disposed within the support section 70. During the operation of the diverter valve 20, the flow diverter 40 facilitates fluid communication between the inlet port 26 and the first outlet port 28 and/or the second outlet port 30. For example, the flow diverter 40 can be positioned with the sidewall 114 inhibiting fluid communication between the second outlet port 30 and the valve chamber 24, while the inclined wall 118 is oriented toward the first outlet port 28 to facilitate fluid flow therethrough.

As shown in FIGS. 5 and 6, the flow diverter 40 includes a rib 130. The rib 130 is a relatively thin, elongated member which extends radially inwardly from the sidewall 114 and the inclined wall 118. The rib 130 is located at a central portion of the sidewall 114 and the inclined wall 118. When the flow diverter 40 rotates, the rib 130 maintains its orientation relative to the sidewall 114 and, thus, maintains its orientation extending along the fluid flow directed by the flow diverter 40. Accordingly, the rib 130 inhibits turbulence and noise as fluid flows through the diverter valve 20.

As shown in FIG. 6, the flow diverter 40 includes a transverse member 132 proximate the second end 112. The transverse member 132 extends between opposing portions of the second end 112 along a radial direction of the main portion 100. In particular, the transverse member 132 is oriented to extend along and support the rib 130. The transverse member 132 also supports an alignment pin 134, as shown in FIGS. 5 and 6. The alignment pin 134 extends from the transverse member 132 in an axial direction away from the main portion 100 and is centered on the transverse member 132 along the radial direction. When the diverter valve 20 is assembled, the alignment pin 134 extends into the aperture 88 of the diverter mounting feature 80 and engages the transverse member 84. Through this engagement, the flow diverter 40 maintains a desired alignment relative to the valve housing 22 while rotating.

As also shown in FIGS. 5 and 6, an axially outwardly facing surface 136 of the second end 112 has a two-tiered configuration including a recessed portion 138, an outward portion 140, and intermediate portions 142, 144 extending therebetween. When the diverter valve 20 is assembled, the outward portion 140 interfaces with the perimeter member 82, and the intermediate portions 142, 144 engage the stop member 86 to limit the rotational range of the flow diverter 40 relative to the valve housing 22. Accordingly, the recessed portion 138 and the stop member 86 are complementarily sized and configured.

As further shown in FIGS. 5 and 6, the main portion 100 of the flow diverter 40 can further define a debris pocket 150. The debris pocket 150 is defined between the sidewall 114 and the inclined wall 118 opposite the rib 130. During operation of the diverter valve 20, the debris pocket 150 collects debris such as sand that accumulates in the diverter valve 20. The debris pocket 150 contributes to the debris resistance of the diverter valve 20, which provides for a decrease in friction and ease of rotation of valve components.

The flow diverter 40 also includes a groove 152 on the radially outer surface of the main portion 100 proximate the first end 110. The groove 152 is configured to receive an o-ring 154, as shown in FIGS. 2 and 3. The o-ring 154 sealingly engages the main portion 100 at the groove 152 and the inside surface 72 at the support section 70. The o-ring 154 provides a seal between the valve chamber 24 and the debris pocket 150.

As shown in FIGS. 5 and 6, the plunger portion 102 of the flow diverter 40 includes a cylindrical portion 160 and a coupling end 162. The cylindrical portion 160 is secured to the main body 100 at the outer surface 151 of the inclined wall 118. As shown in FIG. 6, an aperture 164 extends axially into the plunger portion 102 at the coupling end 162. When the diverter valve 20 is assembled, the cap 50 engages the flow diverter 40 at the coupling end 162.

As shown in FIGS. 1-3, the diverter valve 20 includes a plurality of components coupled outside of the valve housing 22 proximate the cap 50. A housing connector 180 is threadingly engaged to a first threaded outer portion 181 of the support section 70. An outer intake 182 is disposed on the housing connector 180, a seal 184 is disposed on the outer intake 182, and an inner intake 186 is disposed on the seal 184. An intake diverter 188 extends over the inner intake 186 and the plunger portion 102. Both the inner intake 186 and the intake diverter 188 threadingly engage a second threaded outer portion 189 of the support section 70. An o-ring 190 is disposed between the intake diverter 188 and the plunger portion 102, and an o-ring 192 is disposed between the intake diverter 188 and the support section 70. The cap 50 is disposed over the intake diverter 188 and engaged with the flow diverter 40 at the coupling end 162 of the plunger portion 102.

When assembled, the cap 50 engages the flow diverter 40 so that manipulation of the cap 50 positions the flow diverter 40 within the valve housing 22. The positioning of the flow diverter 40 determines the fluid flow between the inlet port 26 and the first outlet port 28 and the second outlet port 30.

Figure 7:
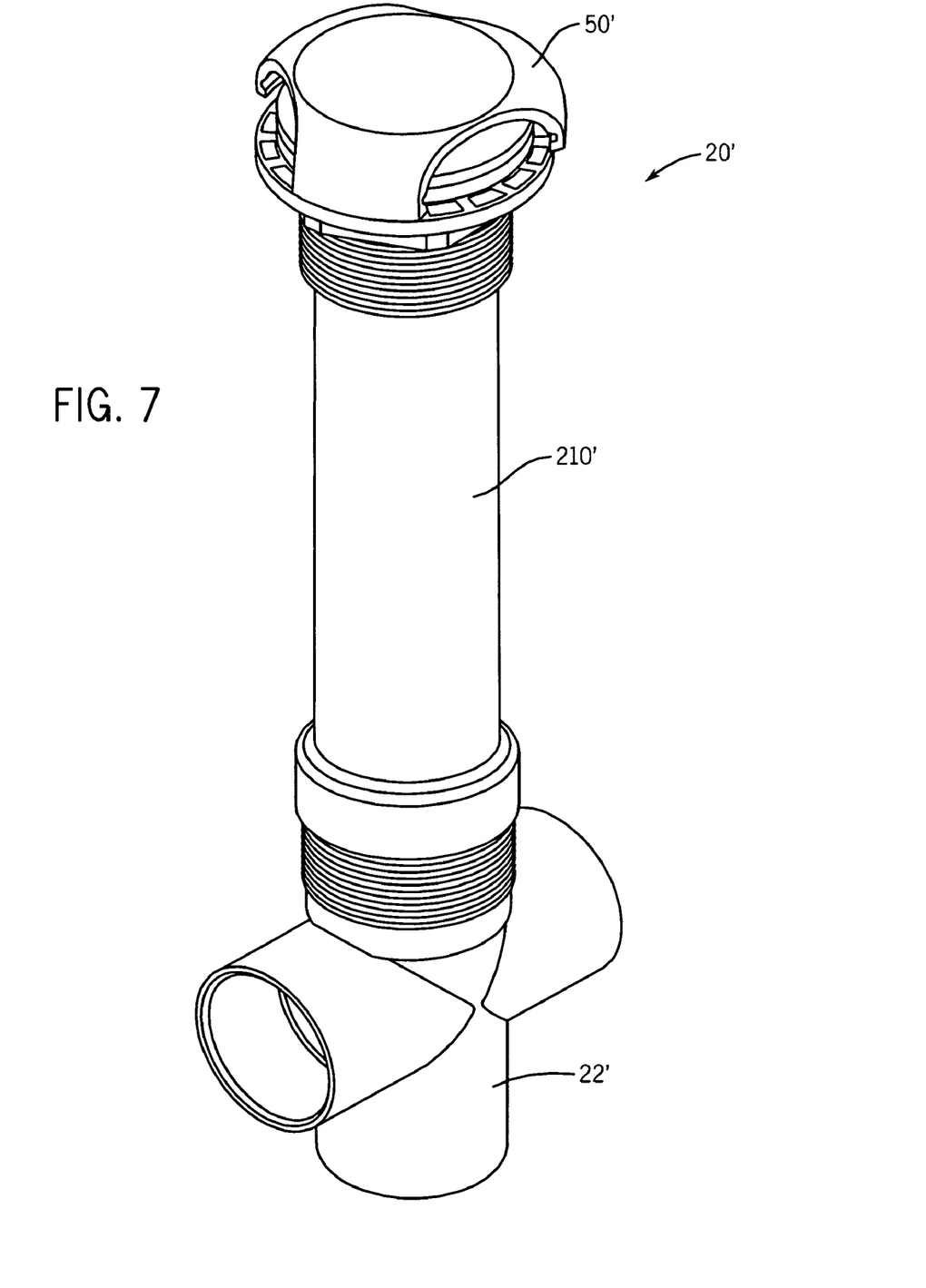
FIG. 7 is a perspective view of a diverter valve according to another embodiment of the invention.
Figure 8:
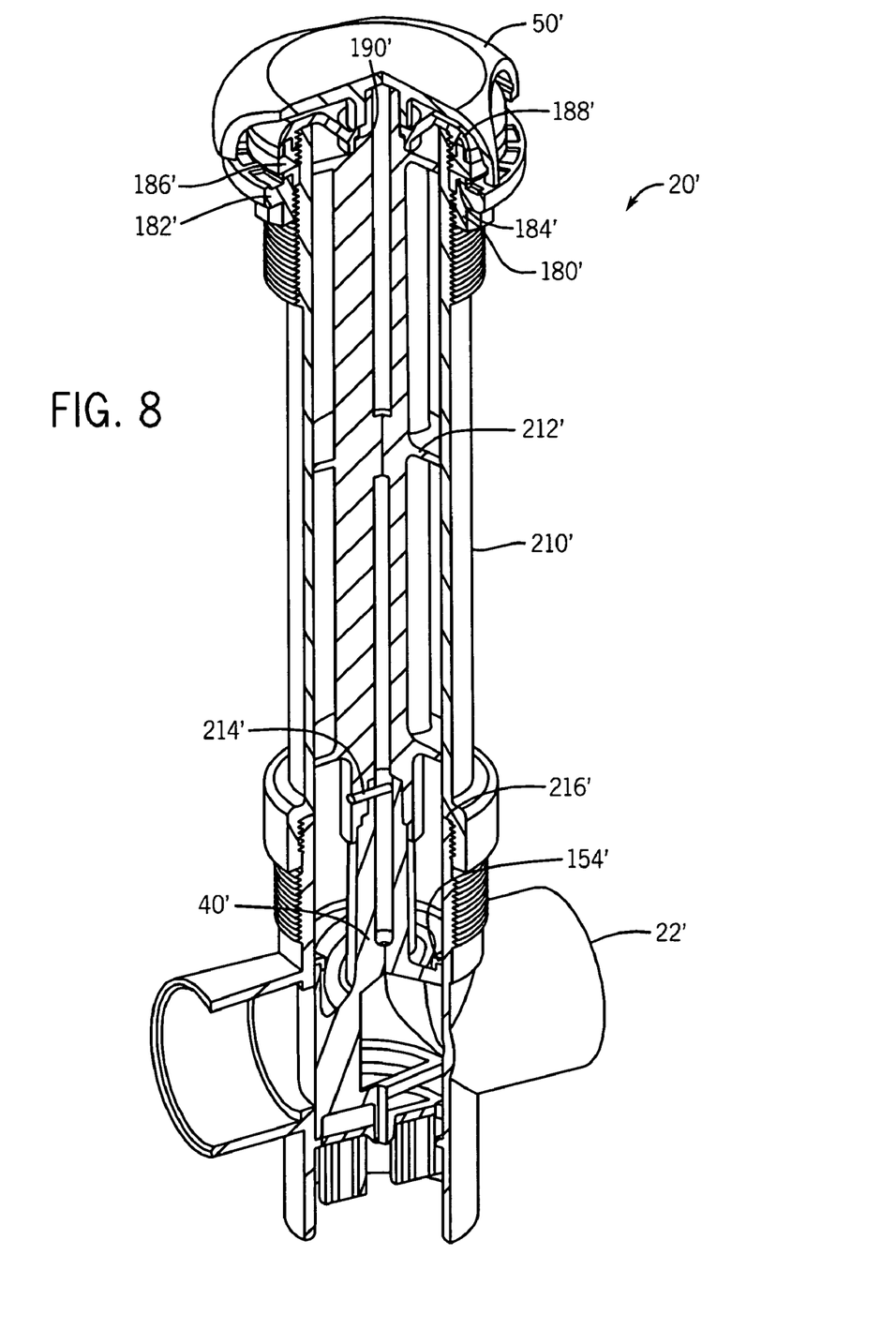
FIG. 8 is a partially-sectioned perspective view of the diverter valve of FIG. 7.
Figure 9:
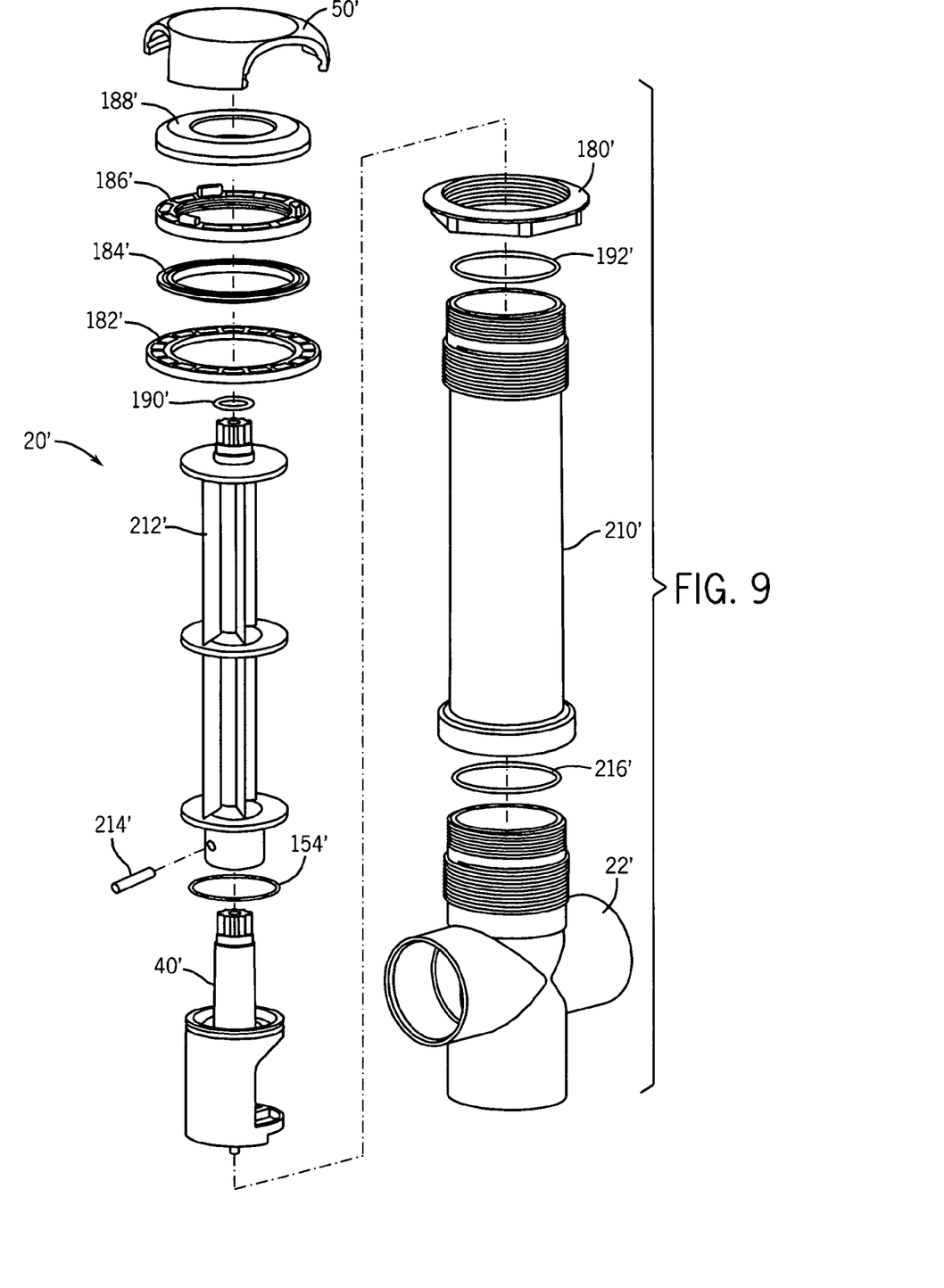
FIG. 9 is an exploded perspective view of the diverter valve of FIG. 7.

FIGS. 7-9 illustrate a diverter valve 20' according to another embodiment of the invention. Many of the components of diverter valve 20' are substantially similar or the same as components described herein with respect to diverter valve 20. Accordingly, the descriptions of such components will not be repeated herein. Such components are represented herein with similar reference numerals (e.g. 15 and 15').

The diverter valve 20' includes a housing extension 210' between the support section 70' and the cap 50'. A plunger extension 212' is disposed within the housing extension 210' and extends between the plunger portion 102' and the cap 50'. A pin 214' couples the plunger extension 212' and the plunger portion 102', and an o-ring 216' is disposed between the support section 70' and the housing extension 210'. The cap 50' is disposed away from the flow diverter 40' and the valve housing 22' while maintaining an operable connection to the flow diverter 40'.

Various features and advantages of the invention are set forth in the following claims.

The invention claimed is:

1. A diverter valve comprising:
   a valve housing defining a valve chamber and a plurality of ports in fluid communication with the valve chamber, the plurality of ports including at least an inlet port and an outlet port;
   a flow diverter extending into the valve chamber, the flow diverter pivotally coupled to the valve housing about a pivot axis defined through the valve chamber, the flow diverter including a main portion extending into the valve chamber and a plunger portion disposed outside of the valve chamber, the main portion having a diverting wall radially spaced apart from the pivot axis, the flow diverter including a rib extending radially inwardly from the diverting wall toward the pivot axis, the rib being disposed at a substantially central position of the diverting wall the main portion of the flow diverter including an inclined wall extending between the diverting wall and the plunger portion and an annular end section proximate the plunger portion, the flow diverter defining a debris pocket facing away from the valve chamber with the diverting wall, the inclined wall, and the annular end section; and
   a cap disposed outside the valve housing and coupled to the plunger portion of the flow diverter.

2. The diverter valve of claim 1, and further comprising an o-ring disposed between the annular end section and the valve housing, the o-ring providing a seal between the debris pocket and the valve chamber.

3. A diverter valve comprising:
   a valve housing defining a valve chamber and a plurality of ports in fluid communication with the valve chamber, the plurality of ports including at least an inlet port and an outlet port;
   a flow diverter extending into the valve chamber, the flow diverter pivotally coupled to the valve housing about a pivot axis defined through the valve chamber, the flow diverter including a main portion extending into the valve chamber and a plunger portion disposed outside of the valve chamber, the main portion having a diverting wall radially spaced apart from the pivot axis, the flow diverter including a rib extending radially inwardly from the diverting wall toward the pivot axis, the rib being disposed at a substantially central position of the diverting wall;
   a cap disposed outside the valve housing and coupled to the plunger portion of the flow diverter; and
   at least one wing member disposed within the inlet port and secured relative to the valve housing, the at least one wing member having an elongate shape with a length and a width and being relatively thin, the at least one wing member being oriented with the length extending along the inlet port.

* * * * *